(12) United States Patent
Louie (10) Patent No.: US 10,917,422 B2
(45) Date of Patent: *Feb. 9, 2021

(54) DIGITAL AUDITING SYSTEM AND METHOD FOR DETECTING UNAUTHORIZED ACTIVITIES ON WEBSITES

(71) Applicant: DEV/CON DETECT, INC., Memphis, TN (US)

(72) Inventor: Margaret C. Louie, Tampa, FL (US)

(73) Assignee: DEV/CON DETECT, INC., Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/523,395

(22) Filed: Jul. 26, 2019

(65) Prior Publication Data

US 2019/0356686 A1    Nov. 21, 2019

Related U.S. Application Data

(63) Continuation of application No. 16/301,912, filed as application No. PCT/US2017/060827 on Nov. 9, 2017.

(Continued)

(51) Int. Cl.
*H04L 29/06* (2006.01)
*G06F 21/55* (2013.01)
(Continued)

(52) U.S. Cl.
CPC ........ *H04L 63/1425* (2013.01); *G06F 16/951* (2019.01); *G06F 21/00* (2013.01);
(Continued)

(58) Field of Classification Search
CPC ...... G06N 20/00; G06N 5/047; G06F 16/951; G06F 21/00; G06F 21/55; G06F 21/554;
(Continued)

(56) References Cited

U.S. PATENT DOCUMENTS 7,805,419 B2    9/2010   Newman
8,082,349 B1    12/2011  Bhargava et al.
(Continued)

OTHER PUBLICATIONS

International Search Report and Written Opinion for PCT/US2017/060827 dated Jan. 8, 2018.
(Continued)

*Primary Examiner* — Hee K Song
(74) *Attorney, Agent, or Firm* — DLA Piper LLP (US)

(57) ABSTRACT

An auditing system (10) is provided for detecting at least one unauthorized operational activity in at least one website, and includes a processor coupled to at least one database (34) for storing data related to the at least one unauthorized operational activity. The processor is programmed to detect the at least one unauthorized operational activity in the at least one website using a monitoring module (22) configured to monitor the at least one website via a network (16) and provide unauthorized operational status information about the at least one website using a plurality of status messages generated based on the data, and a detection module (24) configured to examine the plurality of status messages and detect an anomaly caused by the at least one unauthorized operational activity.

19 Claims, 6 Drawing Sheets

Related U.S. Application Data (60) Provisional application No. 62/419,681, filed on Nov. 9, 2016.

(51) Int. Cl.
  *G06F 21/00* (2013.01)
  *G06F 21/57* (2013.01)
  *G06F 21/56* (2013.01)
  *G06N 20/00* (2019.01)
  *G06F 16/951* (2019.01)
  *G06N 5/04* (2006.01)

(52) U.S. Cl.
  CPC ............ *G06F 21/55* (2013.01); *G06F 21/554* (2013.01); *G06F 21/56* (2013.01); *G06F 21/57* (2013.01); *G06N 5/047* (2013.01); *G06N 20/00* (2019.01); *G06F 2221/034* (2013.01); *G06F 2221/2101* (2013.01)

(58) Field of Classification Search
  CPC .... G06F 21/56; G06F 21/57; G06F 2221/034; G06F 2221/2101
  See application file for complete search history.

(56) References Cited

U.S. PATENT DOCUMENTS

| | | |
|---|---|---|
| 8,595,834 B2 | 11/2013 | Xie et al. |
| 9,124,622 B1 | 9/2015 | Falkowitz et al. |
| 9,275,226 B1 | 3/2016 | Roundy et al. |
| 2011/0083185 A1* | 4/2011 | Sheleheda ............ G06F 21/552 726/24 |
| 2011/0083186 A1* | 4/2011 | Niemela ............... G06F 21/566 726/24 |
| 2012/0036580 A1 | 2/2012 | Gorny et al. |
| 2012/0240236 A1* | 9/2012 | Wyatt .................... G06F 21/10 726/25 |
| 2013/0227691 A1 | 8/2013 | Aziz et al. |
| 2015/0373044 A1 | 12/2015 | Stiansen et al. |
| 2016/0014145 A1 | 1/2016 | Sheleheda et al. |
| 2019/0356686 A1 | 11/2019 | Louie |

OTHER PUBLICATIONS

International Preliminary Report on Patentability received for PCT Patent Application No. PCT/US2017/060827 dated May 23, 2019.
Supplementary European Search Report cited in EP 17 86 8617 dated Mar. 17, 2020.

* cited by examiner

DIGITAL AUDITING SYSTEM AND METHOD FOR DETECTING UNAUTHORIZED ACTIVITIES ON WEBSITES

CROSS-REFERENCE TO RELATED APPLICATIONS

The present application is a continuation application of U.S. application Ser. No. 16/301,912 filed Nov. 15, 2018, which claims priority to a national stage application of PCT Application No. PCT/US2017/060827 filed Nov. 9, 2017, which claims priority to U.S. provisional Ser. No. 62/419,681, filed on Nov. 9, 2016, titled "DIGITAL AUDITING SYSTEM AND METHOD FOR DETECTING UNAUTHORIZED ACTIVITIES ON WEBSITES." All of the foregoing are incorporated herein by reference in their entireties for all purposes.

FIELD OF THE DISCLOSURE

The present disclosure generally relates to digital auditing systems, and more particularly, to an auditing system for detecting unauthorized activities performed on websites.

BACKGROUND OF THE DISCLOSURE

Conventional display advertisement, for example, in electronic environments and platforms, including publisher sites, commerce (e-commerce) sites, mobile applications, all forms of search engines and browsers, provides a universal method for illustrating various products, such as commercial goods and professional services, by offering business opportunities from small scale industries to large scale industries. Business organizations often host their business on multiple websites to reach new markets and customers as conventional marketing and advertising methods can be less effective than online advertising strategies.

However, in the conventional display advertisement, business transactions are vulnerable to cyber-attacks and security threats. Such cybercrime has become a fast growing underground, unlawful activity committed by savvy perpetrators. In certain cases, these perpetrators unsuspectedly manipulate financial or other related information of the business organizations for monetary gains and business advantages. Many cyber-attacks are generated manually by the perpetrators, or automatically by malware, malicious software as well as seemingly normal codes that perform steps, some hidden and some not hidden, without being detected. Thus, detecting such unauthorized activities has become a new challenge in a cyber world.

Online publishers are typically paid based on a number of times each advertisement is accessed or viewed by the customers, representing a quantifiable amount of website traffic. When a pay-per-click model is used, advertisers pay an advertising platform service publishing the advertisements based on the number of times particular online advertisements are clicked by the customers. For transferring the payment, a publishing company is assigned to a unique publisher identifier such that the publishing company is correctly credited for the advertisement. Thus, safekeeping of the identifier and an associated click counter is an important task for proper operation of the business transactions.

Unfortunately, conventional antivirus software or malware detection systems are ill-equipped to perform effective warning and discovery of the unauthorized activities on the websites due to lack of detectable footprints or signatures left by the perpetrators. Such conventional detection systems mainly focus on programmatic detection of the footprints or signatures related to non-human traffic, non-viewable ads, and malicious programming codes. Manual manipulation of related data or covert replacement of a character string by automated software cannot be readily detected by conventional auditing systems. As a result, advertisers, publishers, platform providers and associated networks are all subject to a vast variety of digital theft, fraud, damages and liabilities.

As such, there are opportunities to develop an improved digital auditing system and method that can effectively detect unauthorized activities performed on the websites for sustaining reliable business transactions and militating against fraud and illegal activities.

SUMMARY

Advantages are achieved by the present digital auditing system or method which includes various modules and an improved database for storing specific information relating to unauthorized operational activities in corresponding websites. The present digital auditing system further includes a computer processor coupled to databases and programmed to perform particular tasks and display relational information of the unauthorized operational activities.

As discussed in greater detail below, the present digital auditing system provides an enhanced auditing function for unauthorized operations using various modules and other related systems. In one embodiment, it is contemplated that the present digital auditing system and method is provided for monitoring and detecting the unauthorized activities on the websites. For example, the present digital auditing system monitors user information, authorized account numbers, advertisement unit numbers, internet protocol (IP) addresses, logs, network account numbers, campaign identifiers, creative identifiers, code strings, email texts, unique publisher identifiers, and the like.

Also included in the present digital auditing system is that a system and method configured for recognizing patterns of such unauthorized activities based on historical information of a comparative logic or algorithm, such as a Qualitative Comparative Analysis (QCA). For example, the QCA includes a heuristic analysis designed to detect the unauthorized activities based on a threat/risk evaluation using various decision trees or weighting techniques. It is contemplated that the patterns may relate to behavioral algorithms, code snippets, criminal planning, key phrases in emails, activity times, serializing of key numeric, revenue trend lines, inventory trend lies, effective cost per mille (eCPM) trend lines, human resources (HR) practices, company organizational structure, reporting standards (Sarbanes-Oxley (SOX) compliant or not), and the like.

Further, the present digital auditing system provides enhanced displays and relations of the unauthorized activities in real time. It is contemplated that the detected unauthorized activities are removed from the corresponding websites, and are prevented from future potential cyber-attacks. Consequently, the present digital auditing system protects business organizations, entrepreneurs, and other users engaged in the business transactions from losses incurred by the unauthorized activities such as false advertising and general fraud, including publishing, agency, medical, insurance, gaming industry fraud, and the like.

Other advantages include that advertisers or agencies can limit payment on non-viewable advertisements and fraudulent advertisements produced by deceptive techniques, such as pixel fraud, advertisement stacking, non-human traffic, non-viewable impressions, traffic fraud, search engine optimization (SEO) falsification and data-leakage on the websites. Further, advertisement publishers can limit risks associated with skimming of advertisement revenue at a programming code level whether the unauthorized activities are performed internally or externally. Thus, the liabilities associated with the unauthorized activities may be mitigated, and governmental entities can also be assisted in detecting syndicated practices or extended illegal enterprises.

According to one embodiment, the present disclosure provides an auditing system for detecting at least one unauthorized operational activity in at least one website. The auditing system includes a processor coupled to at least one database for storing data related to the at least one unauthorized operational activity, and programmed to detect the at least one unauthorized operational activity in the at least one website. The processor includes a monitoring module configured to monitor the at least one website via a network and provide unauthorized operational status information about the at least one website using a plurality of status messages generated based on the data, and a detection module configured to examine the plurality of status messages and detect an anomaly caused by the at least one unauthorized operational activity.

In an example, a web crawler is used and distributed in the network for monitoring the at least one web site to identify and collect the at least one unauthorized operational activity performed in the at least one website. In a variation, the monitoring module is configured to perform, using the web crawler, a rendering process to browse each webpage associated with the at least one website including underlying source or execution codes.

In another example, the monitoring module is configured to collect a digital signature of the at least one unauthorized operational activity in the at least one website by tracking a security setting modification. In a variation, the monitoring module is configured to monitor a change of the at least one unauthorized operational activity in the at least one website.

In yet another example, the detection module is configured to perform a pattern recognition technique related to the at least one unauthorized operational activity and identify the anomaly based on a learning analysis.

In still another example, the detection module is configured to retrieve at least a portion of auditing service data associated with the at least one unauthorized operational activity based on the data stored in the database for identifying the anomaly. In a variation, the auditing service data includes historical reference information including previously-set values of authorized and authenticated data associated with the at least one website. In another variation, the detection module is configured to detect an unauthorized change in the auditing service data associated with the at least one website.

In yet still another example, the processor further includes an elimination and lockdown module that is configured to remove the anomaly associated with the at least one unauthorized operational activity, and to perform a lockdown procedure for blocking the at least one unauthorized operational activity in the at least one website. In a variation, the processor further includes a prevention and alert module that is configured to set an access setting associated with the at least one website, and to revert the anomaly back to an original state having authorized and authenticated data.

According to another embodiment, the present disclosure provides an auditing method for detecting at least one unauthorized operational activity in at least one website. The method includes using a processor coupled to at least one database for storing data related to the at least one unauthorized operational activity, and programmed to detect the at least one unauthorized operational activity in the at least one website; monitoring, using the processor, the at least one website via a network to provide unauthorized operational status information about the at least one website using a plurality of status messages generated based on the data; and examining the plurality of status messages and detecting an anomaly caused by the at least one unauthorized operational activity.

In one example, the method further includes distributing a web crawler in the network for monitoring the at least one website and collecting the at least one unauthorized operational activity performed in the at least one website. In a variation, the method further includes performing, using the web crawler, a rendering process to browse each webpage associated with the at least one website including underlying source or execution codes. In another variation, the method further includes collecting a digital signature of the at least one unauthorized operational activity in the at least one website by tracking a digital change associated with the at least one website.

In another example, the method further includes performing a pattern recognition technique related to the at least one unauthorized operational activity to identify the anomaly based on a learning analysis. In a variation, the method further includes retrieving at least a portion of auditing service data associated with the at least one unauthorized operational activity based on the data stored in the database for identifying the anomaly. In a further variation, the method further includes including historical reference information in the auditing service data, the historical reference information having previously-set values of authorized and authenticated data associated with the at least one website. In yet a further variation, the method further includes detecting an unauthorized change in the auditing service data associated with the at least one website based on the digital change.

While multiple embodiments are disclosed, still other embodiments of the present disclosure will become apparent to those skilled in the art from the following detailed description, which shows and describes illustrative embodiments of the present disclosure. Accordingly, the drawings and detailed description are to be regarded as illustrative in nature and not restrictive.

The foregoing and other aspects and features of the disclosure will become apparent to those of reasonable skill in the art from the following detailed description, as considered in conjunction with the accompanying drawings.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE DISCLOSURE

Various embodiments of the present disclosure are described below by way of example only, with reference to the accompanying drawings. Further, the following description is merely illustrative in nature and is in no way intended to limit the disclosure, its application, or uses. As used herein, the term "module" or "unit" may refer to, be part of, or include an Application Specific Integrated Circuit (ASIC), an electronic circuit, a processor or microprocessor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the modules, the scope of the present system should not be so limited since other modifications will become apparent to the skilled practitioner.

Figure 1:
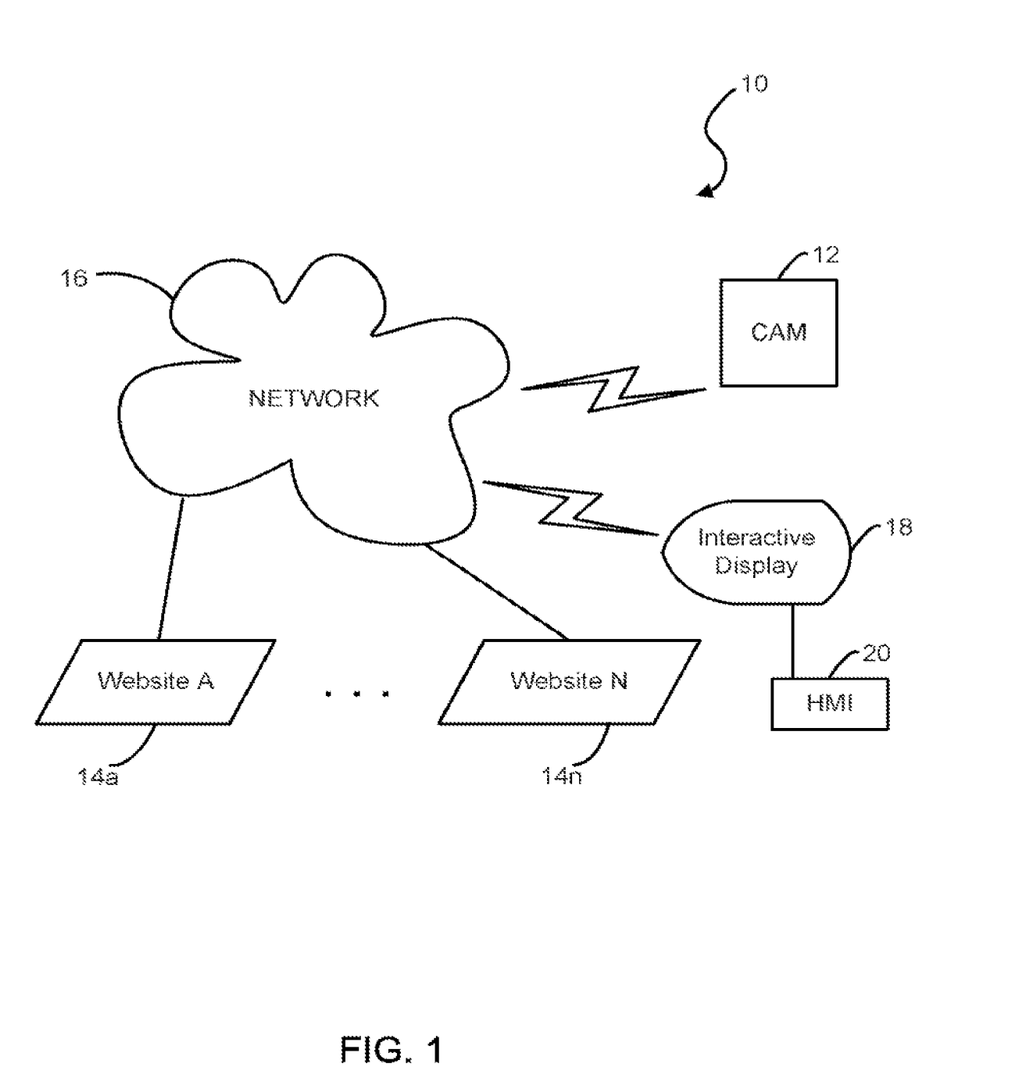
FIG. 1 illustrates an illustrative visualization of the present digital auditing system featuring a central auditing module.

Referring now to FIG. 1, the present digital auditing system is generally designated 10, and is designed to provide an efficient way to detect at least one unauthorized operational activity in one or more corresponding websites, and also to provide enhanced displays and relations of the unauthorized activities in real time. More specifically, the present auditing system 10 includes a central auditing module or unit (CAM) 12, which regulates an overall operation of the present system. In general, the CAM 12 monitors at least one website from a plurality of websites A-N 14a-14n for detecting the unauthorized activity via a network 16.

Any type of computer network having a collection of computers, servers, and other hardware interconnected by communication channels is contemplated, such as the Internet, Intranet, Ethernet, LAN, etc. In one embodiment, the CAM 12 interfaces with the network 16, such as a wireless communication facility (e.g., a Wi-Fi access point), and performs an audit service for detecting the unauthorized activity. Other similar networks known in the art are also contemplated.

When the unauthorized activity is detected by the CAM 12, related information is displayed on an interactive display 18 accessible to an auditor. The CAM 12 manages interactions between the auditor and the present system 10 by way of a human machine interface (HMI) 20, such as a keyboard, a touch sensitive pad or screen, a mouse, a trackball, a voice recognition system, and the like. The interactive display 18 (e.g., textual and graphical) is configured for receiving an input data from the auditor and/or the CAM 12.

In one embodiment, the auditor uses an input device, such as the HMI 20, to graphically or textually interact with the present system 10. Associated data and/or parameters are generally received in the CAM 12 and then transferred to the display device 18 via a dedicated or shared communication system. Further, any collaborative other and third-party database reachable by the CAM 12 can also be used for the auditing service.

Figure 2:
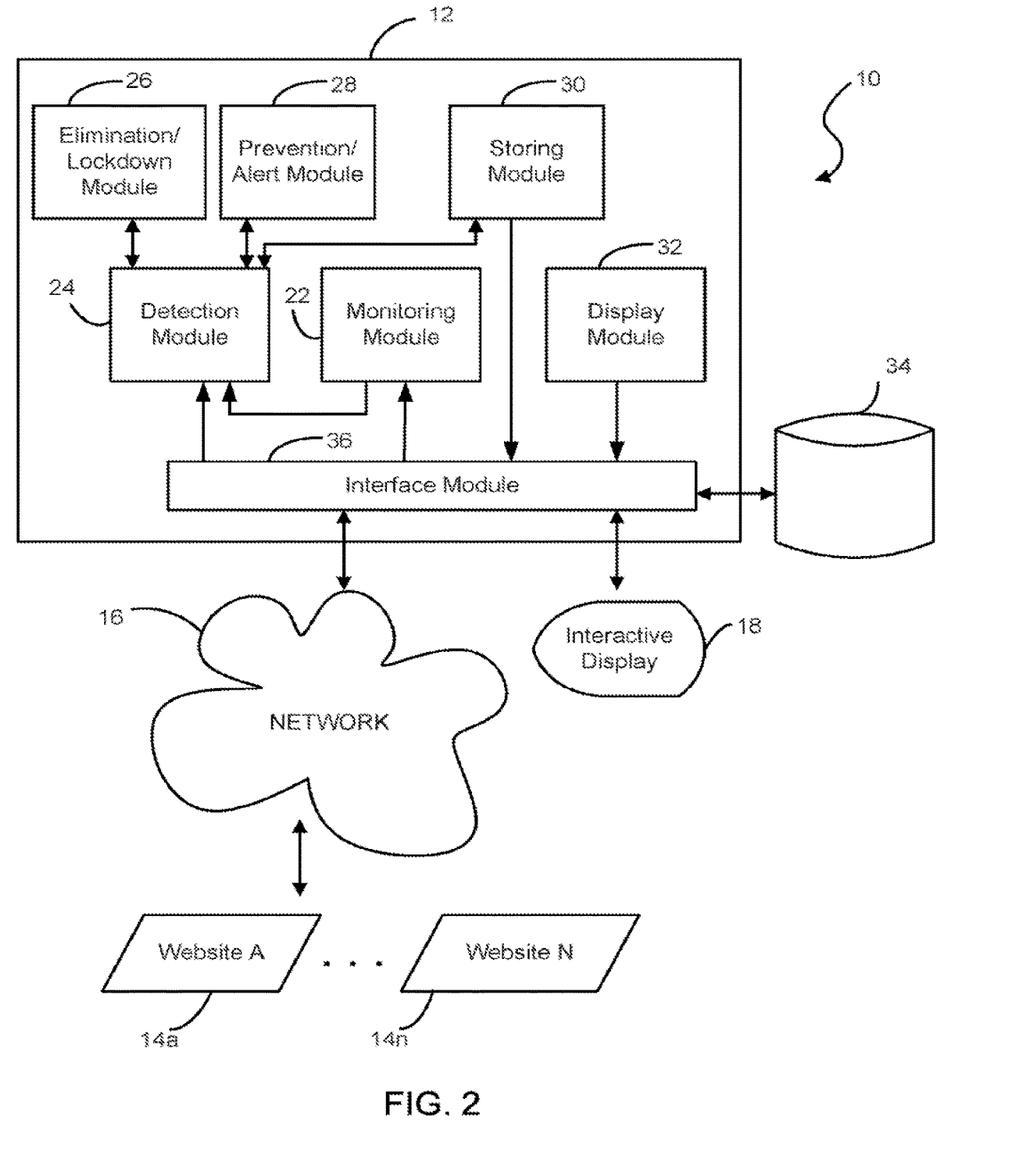
FIG. 2 is a functional block diagram of the present digital auditing system, featuring children modules of the central auditing module of FIG. 1.

Referring now to FIG. 2, it is contemplated that the present digital auditing system 10 includes the CAM 12 having a monitoring module 22, a detection module 24, an elimination and lockdown module 26, a prevention and alert module 28, a storing module 30, and a display module 32. Although these sub-modules 22, 24, 26, 28, 30, 32 are illustrated as children modules subordinate of the parent module CAM 12, each sub-module can be operated as a separate unit from the CAM, and other suitable combinations of sub-modules are contemplated to suit different applications. One or more modules or units can be selectively bundled as a key software model running on the processor having software as a service (SSaS) features.

All relevant information can be stored in a central database 34, e.g., as a non-transitory data storage device and/or a machine readable data storage medium carrying computer-readable information and/or computer-executable instructions, for retrieval by the CAM 12 and its children modules. Also included in the CAM 12 is an interface module 36 for providing an interface between the CAM 12, the central database 34, and the network 16. The interface module 36 controls operation of, for example, the network 16, the display 18, and other related system devices, services, and applications. The other devices, services, and applications may include, but are not limited to, one or more software or hardware components, etc., related to the CAM 12. The interface module 36 also receives data or parameters from the websites A-N 14a-14n, which are communicated to the respective modules, such as the CAM 12, and its children modules 22, 24, 26, 28, 30, 32.

The monitoring module 22 is configured to receive the data and parameters via the interface module 36, and to provide unauthorized operational status information about at least one of the websites A-N 14a-14n. Specifically, the monitoring module 22 provides detailed unauthorized operational status information using a plurality of status messages stored in the database 34. In general, as discussed in greater detail below, the present system 10 assesses the operational status of each website A-N 14a-14n by evaluating the unauthorized activity textually and/or graphically illustrated in the corresponding website.

It is contemplated that web crawler architecture is used and distributed in the network 16 for monitoring the websites A-N 14a-14n. As an example only, web-bots or robots crawl in the network 16 to execute automated tasks for identifying and collecting information about the unauthorized activities performed on the websites AN 14a-14n. The web-bots are programmed software applications running on the microprocessor to crawl the network 16, such that desired information is collected from the websites A-N 14a-14n.

In one embodiment, a specialized crawler program, namely a crawler, is used to capture unique identifiers of the websites A-N 14a-14n. Unlike conventional crawlers that scan only the Hypertext Markup Language (HTML), the monitoring module 22 is configured to perform, using the crawler, a rendering process to browse each webpage associated with the websites A-N 14a-14n including underlying source or execution codes (e.g., JavaScript). For example, the monitoring module reads function call scripts associated with the websites A-N 14a-14n to search for the unique identifiers hidden or injected within the source codes. In another embodiment, the monitoring module 22 is configured to perform a broad crawl across the Internet to search for other instances of the unique identifiers in the source or execution codes and scripts of neighboring websites. For example, the instances of the unique identifiers are detected by using a search algorithm, such as regular expression or pattern recognition techniques. The neighboring websites refer to, for example, publisher's websites, archived websites, or any other suitable web sites having a relationship with the websites A-N 14a-14n.

In some embodiments, during the crawling, the monitoring module 22 collects a digital signature (e.g., footprint or thumbprint) of the corresponding unauthorized activity by tracking a security setting modification. At each security level, when an access level credential is changed, the associated digital footprint or thumbprint is tracked and monitored from an initial ignition point to a subsequent trigger point during a predetermined time period. For example, the access level credential changes are detected by monitoring a security branch management of changes and rollback information on code commit transactions. Any digital change associated with each security setting is tracked and monitored on at least one of: an access criteria set including public and private keys, a target or destination set, an identifier set, and a unique numeric set related to the corresponding website. In one example, the digital change is tracked by monitoring a behavior of a network tag used in the websites A-N 14a-14n (e.g., an identification tag for advertisement). Illustrative digital change detection processes are described below in paragraphs relating to FIGS. 5 and 6.

As is the case with the monitoring module 22, the detection module 24 is also configured to receive the data and parameters from the network 16 via the interface module 36. It is contemplated that the detection module 24 examines the data and parameters received from the monitoring module 22, such as the status messages, and/or the interface module 36 for detecting any anomaly caused by each unauthorized activity based on a predetermined set of rules or algorithms. During operation, the detection module 24 performs a pattern recognition technique related to each unauthorized activity and identifies an anomaly of the corresponding unauthorized activity based on a predetermined analysis in communication with the database 34.

Specifically, the detection module 24 retrieves all or a portion of auditing service data associated with the unauthorized activities from the database 34 for identifying one or more anomalies. It is contemplated that the auditing service data generally refers to historical reference information including original or previously-set values of authorized and authenticated data and parameters associated with each website A-N 14a-14n. A detailed description of the auditing service data is provided below in paragraphs related to FIG. 3.

In one embodiment, the detection module 24 is configured to recognize an unauthorized activity pattern on the websites A-N 14a-14n using a learning analysis. In one example, the learning analysis includes a fuzzy set QCA, a codified weighted grading system, a ranking method, and the like. In another example, this unauthorized activity pattern recognition is performed by the detection module 24 using a machine learning module that performs the learning analysis. For example, each identified unauthorized activity pattern is coded and stored in a criminal code database, such as in the database 34. In one example, the criminal code database is a relational database storing data associated with the unauthorized activity patterns. In some embodiments, each criminal code of the identified unauthorized activity pattern is ranked with a weighted score to quantify a degree of the anomaly caused by the associated unauthorized activity.

As another example, the detection module 24 is configured to generate the weighted score of the identified unauthorized activity pattern using decision tree logic. For example, the decision tree logic includes control charts, Chi-square Automatic Interaction Detector, Iterative Dichotomiser 3, Multivariate Adaptive regression Spines, and the like. Other suitable machine learning technologies are also contemplated to suit different applications. In embodiments, the detection module 24 is configured to determine a likelihood of criminal activity based on the weighted score. For example, types of the criminal activity include fraud, impression leakage, revenue leakage, and the like, but other illegal activity types are also contemplated.

The elimination and lockdown module 26 is configured to remove the identified anomalies associated with the unauthorized activities, and to perform a one-step lockdown procedure for blocking an additional cyber-attack. In one embodiment, the elimination and lockdown module 26 evaluates each detected anomaly by applying a set of predetermined queries in response to unauthorized operation of at least one anomaly. When the elimination and lockdown module 26 determines that the anomaly is to be removed, the auditor with a super admin privilege or another user designated with the super admin privilege can remove or replace the character string, such as a key-code, a unique identifier, or a customizable field, associated with the detected anomaly. Alternatively, the elimination and lockdown module 26 automatically performs this removal task upon detection of a certain anomaly. After the removal of one or more anomalies, the elimination and lockdown module 26 performs the one-step lockdown procedure to prevent an additional cyber-attack by limiting access to relevant websites A-N 14a-14n.

The prevention and alert module 28 is configured to modify or set a digital benchmark, security, or access setting associated with the corresponding websites A-N 14a-14n, and to inform the auditor or other users of the detected anomaly. One or more warning messages are sent by the prevention and alert module 28 to a mobile device or any computing device to alert the auditor or other users. It is also contemplated that when the anomaly caused by the unauthorized activity is detected, the prevention and alert module 28 reverts an unauthorized change associated with the anomaly back to an original state having a corresponding original or previously-set value based on the auditing service data. In a hierarchical access or privilege configuration, all subordinate administrator settings are discredited upon detection of the anomaly.

The storing module 30 is configured to control and digitally store relevant auditing information related to the websites A-N 14a-14n in the central database 34. More specifically, the central database 34 includes an aggregated information related to the websites A-N 14a-14n having analysis data about anomaly incidents, users, criminal events, revenue losses associated with the unauthorized activities, etc. Further, associated criminal codes, malicious scripts, authors of the malicious scripts, corresponding criminal records of the authors, and other relevant data are stored in the database 34 for the purposes of research, development, improvement of the comparative logic or algorithms and further investigations.

The display module 32 is configured to interactively display an appropriate status or information message associated with the anomaly for illustration on the interactive display 18. An instance report related to each anomaly is generated by the display module 32, and also automatically transmitted to a cybercrime agency or other entity, as desired. Searchable database codes and record identifiers are used to logically link to one or more specific unauthorized activities stored in the database 34. Other numeric organizations or serializations are performed by the display module 32 to selectively illustrate correlations between the detected anomalies and relevant syndicated unlawful practices or extended criminal enterprises.

Figure 3:
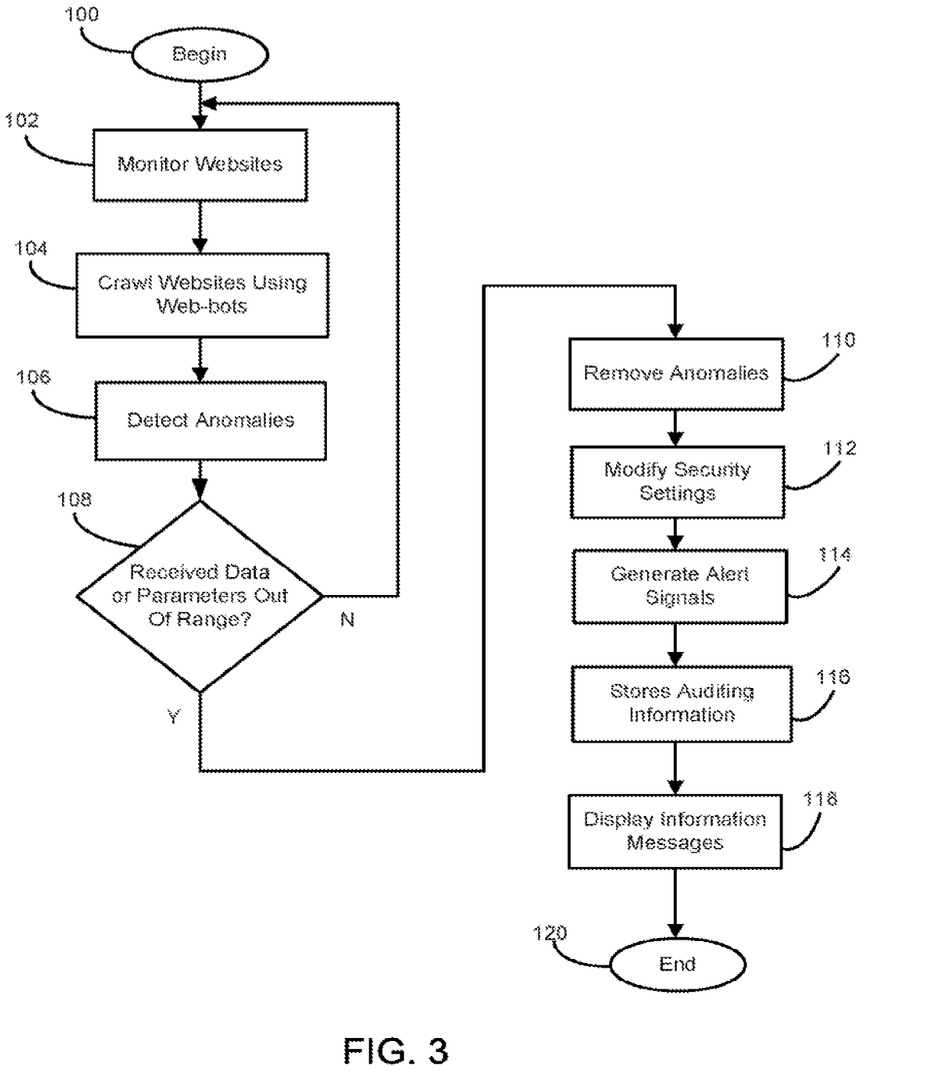
FIG. 3 is a flow chart of an illustrative method of executing the present digital auditing system of FIG. 1.

Referring now to FIG. 3, an illustrative method or process of executing the present digital auditing system 10 is illustrated. Although the following steps are primarily described with respect to the embodiments of FIGS. 1-2, it should be understood that the steps within the method may be modified and executed in a different order or sequence without altering the principles of the present disclosure.

The method begins at step 100. In step 102, the monitoring module 22 monitors one or more of the websites A-N 14a-14n via the network 16 using the interface module 36. In step 104, the monitoring module 22 performs fetching operations by launching the web-bots, such as spider programs, to crawl the websites A-N 14a-14n to collect the unique identifiers associated with the publishers of corresponding websites. As discussed above, the monitoring module 22 gathers detailed operational data and parameters, such as the unique identifiers, of each website A-N 14a-14n using the web-bots.

In step 106, the detection module 24 receives the data and parameters from the monitoring module 22, and examines the data and parameters to detect any anomalies associated with the unauthorized activities based on a predetermined set of rules stored in the database 34. During operation, the detection module 24 performs a comparative logic for a predetermined time period to evaluate any change or modification caused by the unauthorized activities based on the anomaly analysis in communication with the database 34.

It is contemplated that the detection module 24 logs all activities, including modifications, deletions, and additions, performed on the websites A-N 14a-14n, and scans for any changes in the unique identifiers in comparison with the auditing service data. For example, the auditing service data include validated unique identifiers or other relevant data and parameters associated with the websites A-N 14a-14n in a reference table. When a discrepancy is detected in comparison with the reference table, the detection module 24 records the incident in the database 34 along with relevant data and parameters. When the pay-per-click model is used, the associated unique identifier and click counter are analyzed to determine authenticity.

As an example only, the auditing service data include valid unique identifiers of authorized advertisement publishers for each website A-N 14a-14n. When the detection module 24 detects any unauthorized changes (e.g., modifications, deletions, or additions) in the unique identifiers, the click counters, or other settings associated with the websites A-N 14a-14n, such detections are logged in the database 34 along with the data and parameters associated with the anomalies for subsequent retrieval.

In step 108, the elimination and lockdown module 26 analyzes the detected anomalies caused by the unauthorized activities based on the auditing service data. When at least one of the data or parameters are out of acceptable ranges defined by the set of predetermined thresholds or values, control proceeds to step 110. Otherwise, control returns to step 102 and continues the auditing process.

In step 110, the elimination and lockdown module 26 performs removal of the identified anomalies associated with the unauthorized activities. For example, the unauthorized unique identifier is deleted from the corresponding websites A-N 14a-14n. Alternatively, the unauthorized unique identifier is replaced with the valid unique identifier for the authorized advertisement publisher for the corresponding website AN 14a-14n. Further, the elimination and lockdown module 26 performs the one-step lockdown procedure preventing any further changes on the corresponding websites AN 14a-14n, and locks account settings, custom features, and other related settings. It is contemplated that the related settings may include a combination of parameters set by an administrator, and comparative matches are performed to determine a quality of a user with respect to corresponding devices, IP addresses, time use patterns and collective previous identifiers. Additionally, if changes are being attempted by the user, the administrator or user is required to provide a notation as to why the changes are being made, and other administrators are notified of such changes.

In step 112, the prevention and alert module 28 modifies or sets the digital benchmark, security, or access setting associated with the corresponding websites A-N 14a-14n. It is contemplated that the prevention and alert module 28 initiates an authentication procedure when such unauthorized activities are attempted on the websites A-N 14a-14n. For example, when an unauthorized change is attempted on the super admin settings, the authentication procedure is automatically initiated by the prevention and alert module 28.

When the authentication fails, the unauthorized change is reverted back to the original or previously authorized settings, and is also registered in the database 34 as an unauthorized activity pattern. Further, if other similar activities are identified across the websites A-N 14a-14n, the prevention and alert module 28 records associated user and account information in the database 34 for subsequent comparison operation. For example, the prevention and alert module 28 tracks inconsistencies found in data traffic, impressions, advertisement revenue, unique identifiers, website speed, program calls, a number of advertisement networks, cookies and other benchmarks associated with the corresponding websites A-N 14a-14n.

In step 114, the prevention and alert module 28 generates an alert signal to inform the auditor or other users of the detected anomaly. For example, the prevention and alert module 28 transmits the alert signal to a governmental agency to notify an unlawful activity performed on one or more of the websites A-N 14a-14n.

In step 116, the storing module 30 stores relevant auditing information related to the websites A-N 14a-14n in the central database 34. For example, the storing module 30 aggregates the auditing information related to users, incidents, websites, programming codes, account numbers, identifiers, criminal records, incident reports, filings and other data and parameters associated with each anomaly. It is also contemplated that the central database 34 is linked to external databases having criminal records, credit reports, or federal background checks.

It is contemplated that the database 34 includes relevant information used in detecting, preventing, documenting and researching unlawful activities. For example, the database 34 is used to create a geographic-matrix-map connecting corresponding websites A-N 14a-14n, users, activities, unique identifiers, criminal records, revenue, unauthorized activity patterns, and other data points for assisting detection, tracking and prosecution of the cybercrime.

It is contemplated that the database 34 can be accessed by or linked to a human resources department, a governmental agency, a law enforcement agency, a business entity, an investigator, or other users and organizations known in the art. Further, the database 34 is used to develop a software application, plugin, or other lines of business and research engines.

In step 118, the display module 32 illustrates an appropriate status or information message associated with the anomaly for illustration on the interactive display 18. As discussed above, the instance report related to each anomaly is generated by the display module 32, and is also automatically transmitted to a cybercrime agency or other entity, as desired. The method ends at step 120 which may include a return to step 102.

Figure 4:
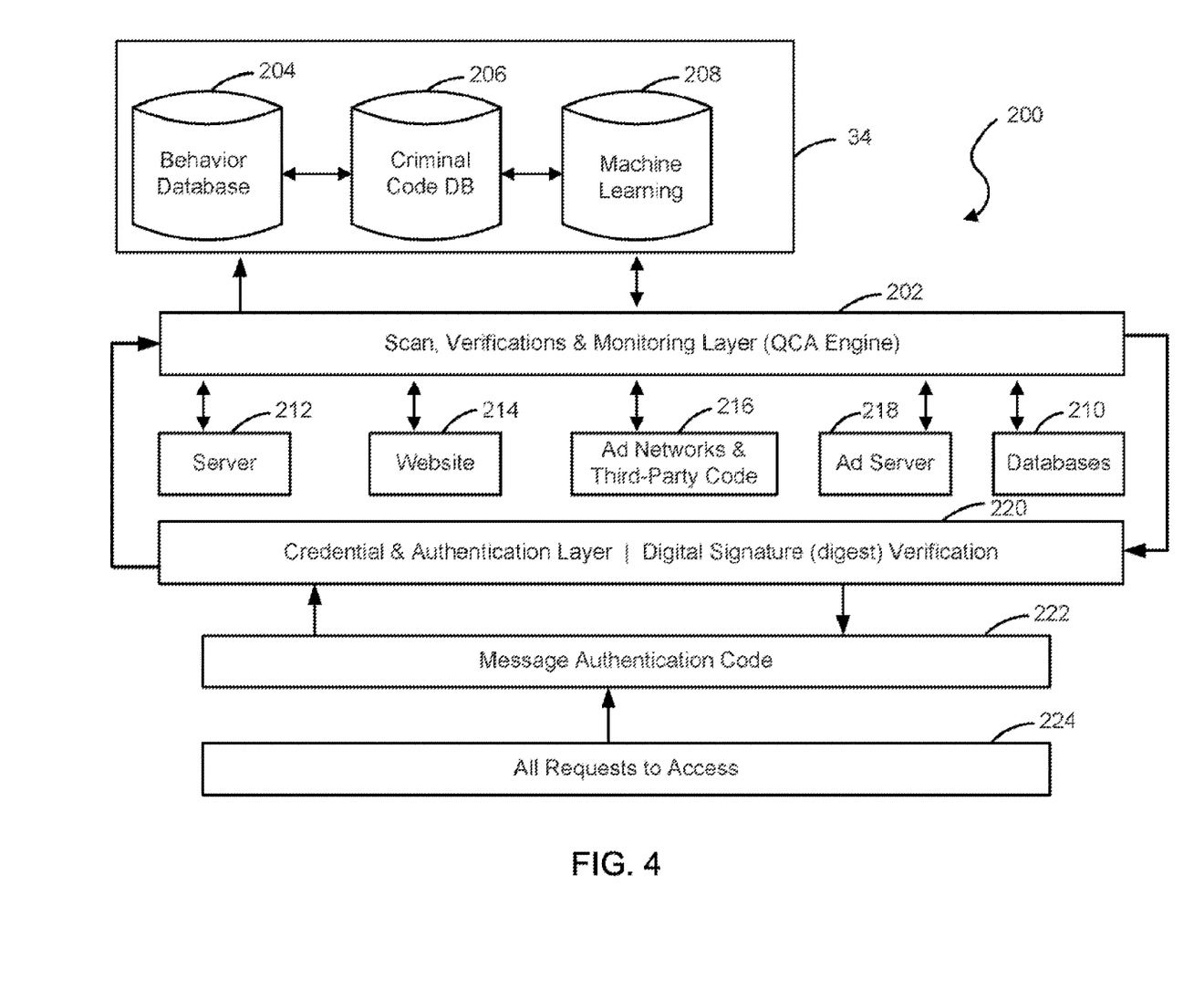
FIG. 4 is an illustrative visualization of an authentication layer used in the present digital auditing system of FIG. 1.

Referring now to FIG. 4, an illustrative authentication layer 200 of the present digital auditing system 10 is shown, and includes one or more comparative logic or algorithm layer 202, such as the QCA. It is contemplated that the authentication layer 200 executes at least one of a Secure Hash Algorithm (SHA) and a Message Digest Algorithm (MDA). For granting edit permission, the QCA is performed against hash values associated with the permission to monitor changes related to the corresponding websites A-N 14a-14n. As an example only, a Diffie-Hellman (D-H) key exchanging cryptographic algorithm is performed to verify the changes. When such changes are saved in the database 34, a new hash value is compared to a previous hash value along with an admin-shared secret number. In this example, the database 34 includes a behavior database 204, a criminal code database 206, and a machine learning database 208, but other suitable databases 210 are also included in communication with the logic layer 202. Other servers 212, websites 214, networks 216, advertisement servers 218, and the like are also operatively coupled to the logic layer 202.

In this example, the authentication layer 200 further includes a credential and authentication layer 220 in communication with the logic layer 202. In one example, the credential and authentication layer 220 perform a verification process for each operational activity performed on the websites 214 using the logic layer 202. In another example, a message authentication code 222 is verified with the hash value, e.g., a password or passphrase including a random cryptographic salt, when an access request 224 to the websites 214 is requested. It is also contemplated that the authentication layer 200 generates a signature with a public or private key to be used as a digital signature. Further, a message digest (e.g., 128-bit) can be created with a shared secret key to be used as a message authentication code in the digital signature.

Figure 5:
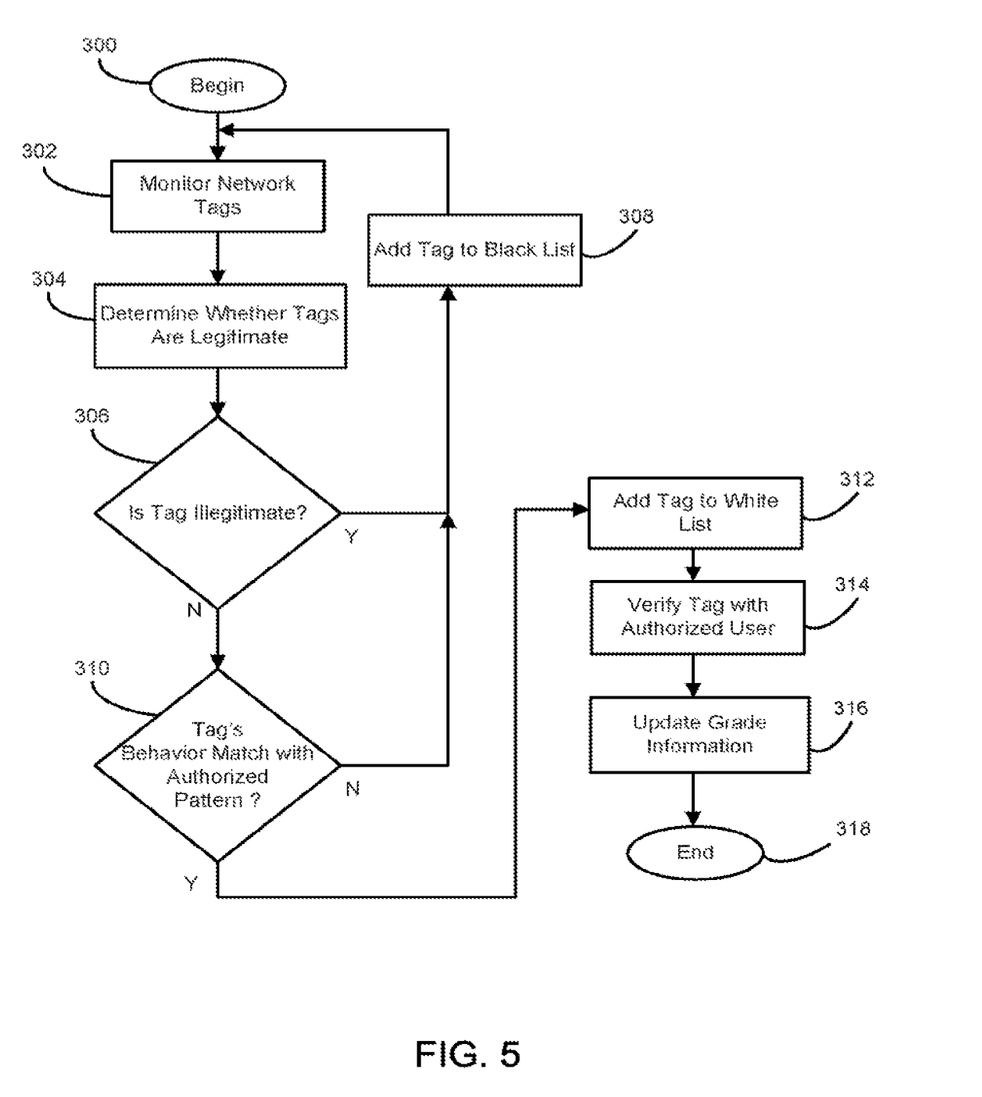
FIGS. 5 and 6 illustrate an illustrative digital change detection method used in the present digital auditing system of FIG. 1.
Figure 6:
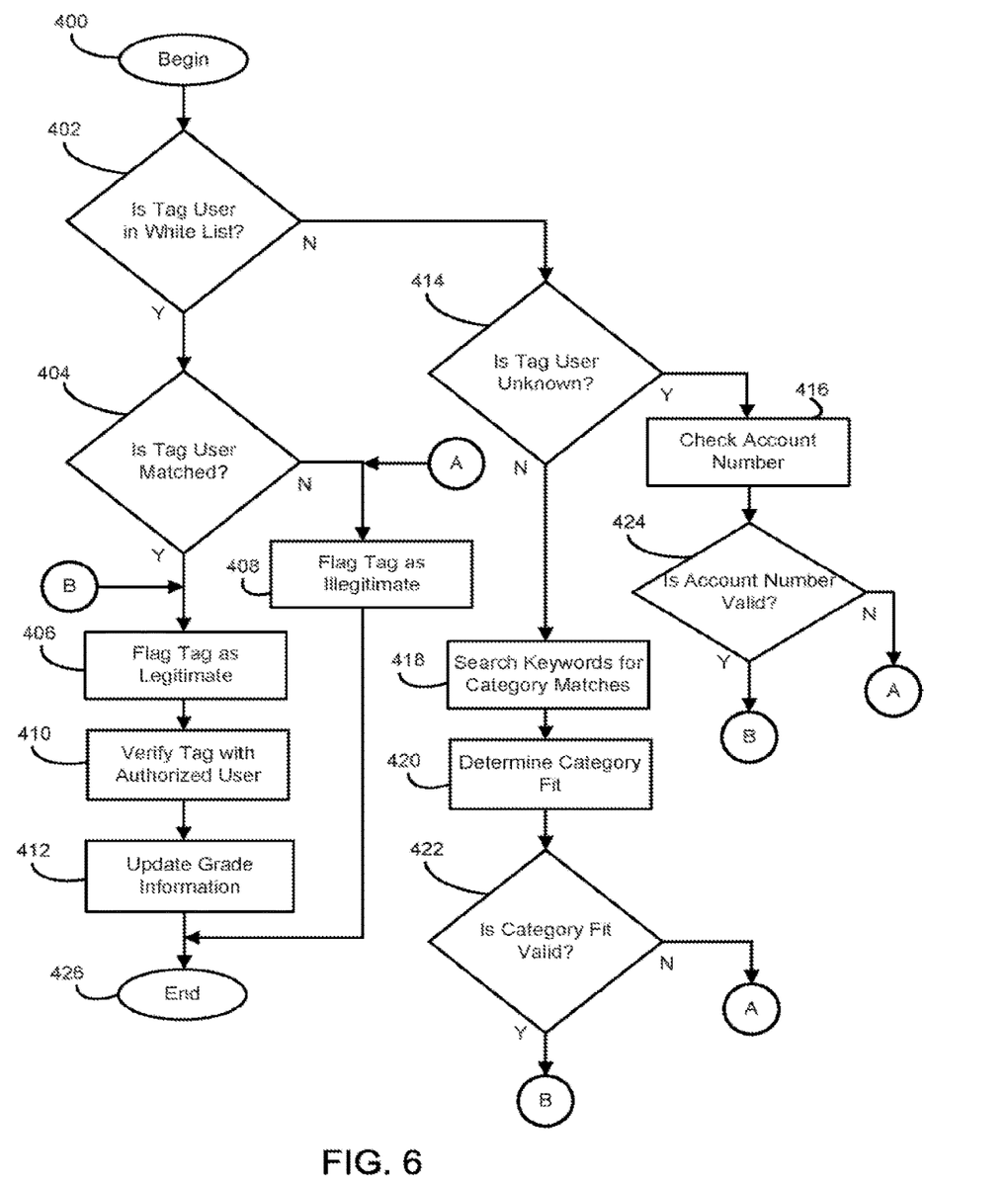

Referring now to FIGS. 5 and 6, an illustrative digital change detection method of the present digital auditing system 10 is illustrated. In this example, a verification process for a network tag, such as the advertisement tag, is shown, but any other digital signatures are also contemplated to suit different applications. Although the following steps are primarily described with respect to the embodiments of FIGS. 1-4, it should be understood that the steps within the method may be modified and executed in a different order or sequence without altering the principles of the present disclosure.

In FIG. 5, the method begins at step 300. In step 302, one or more network tags are monitored for any unauthorized operational activities in the websites A-N 14a-14n. In step 304, the digital auditing system 10 determines whether the network tags are legitimate using the QCA analysis (e.g., using the layer 202 shown in FIG. 4). A detailed illustrative analysis is illustrated in FIG. 6. In step 306, each tag is monitored for any anomaly caused by the unauthorized operational activities. When the tag is determined to be illegitimate based on the anomaly, control proceeds to step 308. Otherwise, control returns to step 310.

In step 308, the tag is added to a black list flagging the tag as unsafe or risky. In one embodiment, the tag is associated with grade information similar to an academic letter grade ranging from "A" to "F" based on a weighted score. For example, the tag is determined to be illegitimate when a behavior pattern of the unauthorized activities fails to meet a predetermined authorized pattern. Then, the tag is assigned to a grade "F" for failing to meet the behavior pattern of authorized activities. Other similar grade determination methods are contemplated to suit the application. Further, as discussed above, a broad crawl is performed across the Internet to search for other instances of the same anomaly in other websites.

In step 310, when the behavior pattern of the tag does not match with the behavior pattern of authorized activities, control proceeds to step 308. Otherwise, control proceeds to step 312. In step 312, the tag is added to a white list flagging the tag as safe. In one example, the black or white list includes additional information about the tag, such as an owner or user information of the tag. Other relevant information associated with the black or white list is also contemplated to suit the application. In step 314, the tag is verified with an authorized user, such as the publisher. In one example, depending on a feedback from the publisher, the tag can be moved to the black list as described in step 308. In step 316, the grade information associated with the tag is updated based on a network weight calculation. For example, the network weight calculation is determined based on a category of profit generated by the tag. Other suitable weight calculation methods are also contemplated to suit different applications. The method ends at step 318 which may include a return to step 302.

In FIG. 6, the illustrative analysis performed in step 304 is illustrated. The method begins at step 400. In step 402, when a user of the tag (e.g., a third party partner of a publisher) appears in the white list, control proceeds to step 404. Otherwise, control proceeds to step 414. In step 404, if the tag user is one of users listed by the authorized user, control proceeds to step 406. Otherwise, control proceeds to step 408. In one example, the tag user is matched with a list of acceptable tag users (e.g., third party partners) identified by the authorized users (e.g., publishers). For example, the tag user is identified as a third party partner with the publisher of the websites A-N 14a-14n based on the data stored in the database 34. In step 406, the tag is flagged as a legitimate tag. In step 408, the tag is flagged as an illegitimate tag. In step 410, the tag is verified with the authorized user, such as the publisher. In step 412, the grade information associated with the tag is updated based on the network weight calculation.

In step 414, an identifier of the tag user is checked to see if the tag user is known to the authorized user (e.g., the publisher). When the identifier is recognized as an unknown tag user (e.g., the identifier is not found in the database 34), control proceeds to step 416. Otherwise, control proceeds to step 418. In step 416, an account number of the tag user is checked for authenticity and validity. In step 418, one or more nomenclature codes associated with the tag, such as keywords in a Uniform Resource Locator (URL), are searched for subject category matches. In step 420, a subject category fit is determined based on the subject category matches. For example, when a subject category of "sports" is associated with the tag user identified as a sport equipment dealer, the category fit is valid. However, when a subject category of "entertainment" is associated with the tag user identified as a non-entertainment entity, the category fit is invalid. Other suitable subject category matches are also contemplated to suit different applications.

In step 422, when the category fit is valid, control proceeds to step 406. Otherwise, control proceeds to step 408. In step 424, when the account number of the tag user is valid, control proceeds to step 406. Otherwise, control proceeds to step 408. The method ends at step 426 which may include a return to step 402.

The above detailed description and the examples described therein have been presented for the purposes of illustration and description only and not for limitation. For example, the operations described can be done in any suitable manner. The methods can be performed in any suitable order while still providing the described operation and results. It is therefore contemplated that the present embodiments cover any and all modifications, variations, or equivalents that fall within the scope of the basic underlying principles disclosed above and claimed herein. Furthermore, while the above description describes hardware in the form of a processor executing code, hardware in the form of a state machine, or dedicated logic capable of producing the same effect, other structures are also contemplated.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus Various modifications and additions can be made to the illustrative embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

The invention claimed is:

1. An auditing system (10) for detecting at least one unauthorized operational activity in at least one website, the auditing system (10) comprising:
 a processor coupled to at least one database (34) for storing data related to the at least one unauthorized operational activity, and programmed to detect the at least one unauthorized operational activity in the at least one website;
 the processor including:
  a monitoring module (22) configured to monitor the at least one website via a network (16), render a webpage associated with the website, the webpage including underlying third party source or execution codes including hidden unique identifiers, and provide unauthorized operational status information about the at least one website using a plurality of status messages generated based on the data, the unauthorized operational status information including unauthorized modification of a hidden unique identifier; and
  a detection module (24) configured to examine the plurality of status messages and detect an anomaly caused by the at least one unauthorized operational activity.

2. The auditing system (10) of claim 1, wherein a web crawler is used and distributed in the network (16) for monitoring the at least one website to identify and collect the at least one unauthorized operational activity performed in the at least one web site.

3. The auditing system (10) of claim 2, wherein the monitoring module (22) is configured to perform, using the web crawler, a rendering process to browse each webpage associated with the at least one website.

4. The auditing system (10) of claim 1, wherein the monitoring module (22) is configured to collect a digital signature of the at least one unauthorized operational activity in the at least one website by tracking a security setting modification.

5. The auditing system (10) of claim 4, wherein the monitoring module (22) is configured to monitor a change of the at least one unauthorized operational activity in the at least one website.

6. The auditing system (10) of claim 1, wherein the detection module (24) is configured to perform a pattern recognition technique related to the at least one unauthorized operational activity and identify the anomaly based on a learning analysis.

7. The auditing system (10) of claim 1, wherein the detection module (24) is configured to retrieve at least a portion of auditing service data associated with the at least one unauthorized operational activity based on the data stored in the database (34) for identifying the anomaly.

8. The auditing system (10) of claim 7, wherein the auditing service data includes historical reference information including previously-set values of authorized and authenticated data associated with the at least one website.

9. The auditing system (10) of claim 8, wherein the detection module (24) is configured to detect an unauthorized change in the auditing service data associated with the at least one website.

10. The auditing system (10) of claim 1, wherein the processor further includes an elimination and lockdown module (26) that is configured to remove the anomaly associated with the at least one unauthorized operational activity, and to perform a lockdown procedure for blocking the at least one unauthorized operational activity in the at least one website.

11. The auditing system (10) of claim 1, wherein the processor further includes a prevention and alert module (28) that is configured to set an access setting associated with the at least one website, and to revert the anomaly back to an original state having authorized and authenticated data.

12. An auditing method for detecting at least one unauthorized operational activity in at least one website, comprising:
 using a processor coupled to at least one database (34) for storing data related to the at least one unauthorized operational activity, and programmed to detect the at least one unauthorized operational activity in the at least one website;
 monitoring, using the processor, the at least one website via a network (16) and render a webpage associated with the website, the webpage including underlying third party source or execution codes including hidden unique identifiers, to provide unauthorized operational status information about the at least one website using a plurality of status messages generated based on the data, the unauthorized operational status information including unauthorized modification of a hidden unique identifier; and examining the plurality of status messages and detecting an anomaly caused by the at least one unauthorized operational activity.

13. The auditing method of claim 12, further comprising distributing a web crawler in the network (16) for monitoring the at least one website and collecting the at least one unauthorized operational activity performed in the at least one website.

14. The auditing method of claim 13, further comprising performing, using the web crawler, a rendering process to browse each webpage associated with the at least one website including underlying source or execution codes.

15. The auditing method of claim 12, further comprising collecting a digital signature of the at least one unauthorized operational activity in the at least one website by tracking a digital change associated with the at least one website.

16. The auditing method of claim 12, further comprising performing a pattern recognition technique related to the at least one unauthorized operational activity to identify the anomaly based on a learning analysis.

17. The auditing method of claim 15, further comprising retrieving at least a portion of auditing service data associated with the at least one unauthorized operational activity based on the data stored in the database (34) for identifying the anomaly.

18. The auditing method of claim 17, further comprising including historical reference information in the auditing service data, the historical reference information having previously-set values of authorized and authenticated data associated with the at least one website.

19. The auditing method of claim 18, further comprising detecting an unauthorized change in the auditing service data associated with the at least one website based on the digital change.

* * * * *